US012734966B2

(12) United States Patent
Vincent et al.

(10) Patent No.: US 12,734,966 B2
(45) Date of Patent: Sep. 15, 2026

(54) GUARDRAIL ASSEMBLY FOR WORK MACHINE

(71) Applicant: Caterpillar Global Mining Equipment LLC, Denison, TX (US)

(72) Inventors: Antony Stephen Paul Vincent, Chennai (IN); Ian Alistair Tiggemann, Peoria, IL (US); Arul Kumar Ramasamy, Chengalpattu (IN)

(73) Assignee: Caterpillar Global Mining Equipment LLC, Denison, TX (US)

( * ) Notice: Subject to any disclaimer, the term of this patent is extended or adjusted under 35 U.S.C. 154(b) by 829 days.

(21) Appl. No.: 18/190,173

(22) Filed: Mar. 27, 2023

(65) Prior Publication Data

US 2024/0326696 A1 Oct. 3, 2024

(51) Int. Cl.
*B60R 3/00* (2006.01)

(52) U.S. Cl.
CPC .................................... *B60R 3/005* (2013.01)

(58) Field of Classification Search
CPC .. B60R 3/005; B60R 7/02; E04G 5/14; E04G 5/142; E04G 5/144; E04G 21/3219; E04G 21/3242; E04G 21/3233; E04G 21/32; E06B 2009/002; E06B 11/025; E06C 7/181; E06C 7/182; E04H 17/1447; E04H 17/1417; F16P 1/02; E02F 9/0833
See application file for complete search history.

(56) References Cited

U.S. PATENT DOCUMENTS 2,873,904 A 2/1959 Mccormick
4,613,155 A * 9/1986 Greenwood ....... A01D 41/1261 105/457
6,810,995 B2 11/2004 Warford
8,931,594 B2 1/2015 Kreller
(Continued)

FOREIGN PATENT DOCUMENTS

DE 102020128880 A1 * 5/2021 ............... E06C 1/39
EP 0018460 A1 11/1980
(Continued)

OTHER PUBLICATIONS

DE-102020128880-A1 (Year: 2021).*
(Continued)

*Primary Examiner* — David E Martinez

(57) ABSTRACT

A guardrail assembly for an operator platform of a work machine defines a major surface. The guardrail assembly includes a handrail removably coupled to the operator platform. The handrail including a pair of first members spaced apart from each other and a second member coupled to and extending orthogonally between the pair of first members. The handrail is movable between an extended position and a retracted position relative to the major surface of the operator platform. The guardrail assembly also includes a pair of handrail locking mechanisms removably coupling the handrail to the operator platform. The guardrail assembly further includes a midrail removably coupled to each first member at corresponding opposing ends of the midrail. The guardrail assembly includes a pair of midrail
(Continued)

locking mechanisms removably coupling the midrail to each first member at corresponding opposing ends of the midrail.

20 Claims, 8 Drawing Sheets

(56) References Cited

U.S. PATENT DOCUMENTS

| | | | | |
|---|---|---|---|---|
| 9,233,646 | B2 * | 1/2016 | Koshy | E04H 17/1417 |
| 9,650,796 | B2 | 5/2017 | Klingenberg | |
| 11,156,008 | B2 * | 10/2021 | Phan | B64F 5/60 |
| 11,174,644 | B2 | 11/2021 | Cartwright-Taylor | |
| 11,512,477 | B2 * | 11/2022 | Restivo | E04G 5/14 |
| 11,667,241 | B2 * | 6/2023 | Koshy | B60R 3/005<br>256/26 |
| 2015/0246641 | A1 * | 9/2015 | Jayapalan | B60R 3/005<br>182/113 |
| 2021/0047846 | A1 * | 2/2021 | Curtis | E04G 7/28 |
| 2023/0264925 | A1 * | 8/2023 | Schlabach | B66B 13/303 |

FOREIGN PATENT DOCUMENTS

| | | | | |
|---|---|---|---|---|
| EP | 2572759 | A1 * | 3/2013 | E04G 5/14 |
| EP | 3156025 | A1 * | 4/2017 | B66F 11/04 |
| KR | 101805796 | B1 | 12/2017 | |

OTHER PUBLICATIONS

EP-2572759-A1 (Year: 2013).*
EP-3156025-A1 (Year: 2017).*
Peak Supply Company, Guardian 15170 Parapet Clamp Guardrail System, Catalog.

* cited by examiner

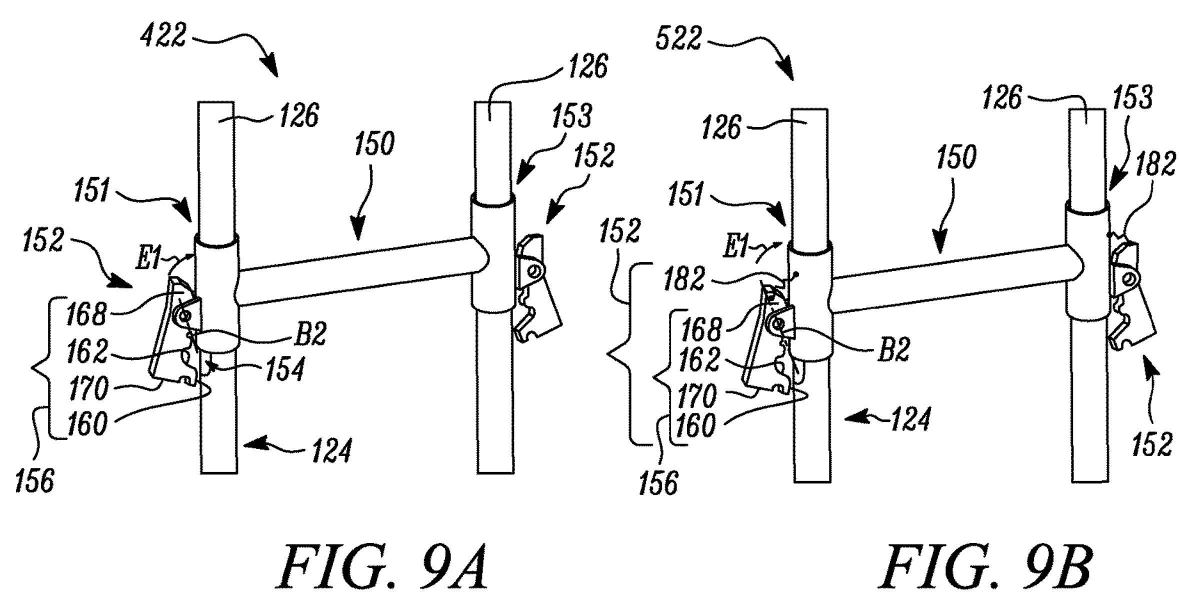
FIG. 9A
FIG. 9B
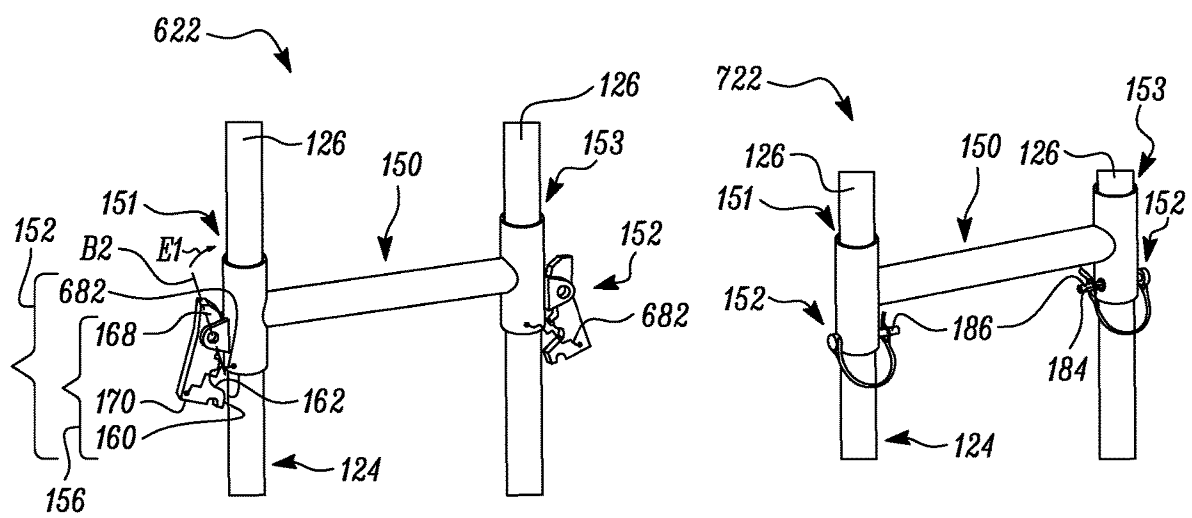
FIG. 9C
FIG. 9D
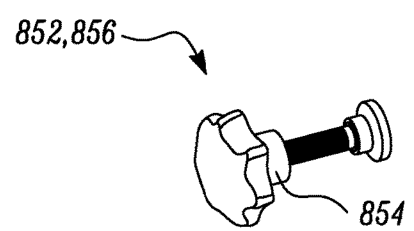
FIG. 9E
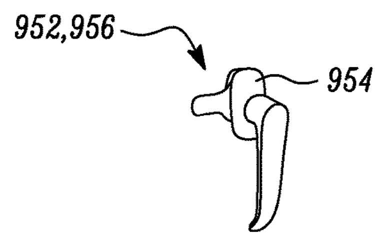
FIG. 9F

GUARDRAIL ASSEMBLY FOR WORK MACHINE

TECHNICAL FIELD

The present disclosure relates to a guardrail assembly for an operator platform of a work machine.

BACKGROUND

A work machine, such as, a mining truck, an off-highway truck, a wheel loader, a dozer, or an excavator may be used to perform a variety of applications at a worksite.

Typically, during servicing/maintenance of the work machine, it may be desirable to move one or more portions of the work machine relative to a fixed portion to access components disposed underneath. For example, the dump body of the mining truck may have to be moved to a raised position in order to access one or more components located beneath the dump body. In some examples, the work machine may include a platform with a handrail to allow a user to stand and observe/perform servicing/maintenance of the work machine. Generally, the platform and the handrail may be associated with a number of machines that have an increased height from the ground level to allow a comfortable working space for operators/personnel.

The handrail that may be held by a user, such as, a personnel/operator while the user is standing on the platform. Thus, the handrail must be in an extended position during servicing/maintenance, whereas the handrail must be in a retracted position when the dump body is in the lowered position so that the handrail does not interfere with a movement of the dump body. Conventionally, handrails are stored separately, and may have to be coupled to the platform when servicing/maintenance of the work machine is required. Further, the handrails may have to be carried to the work machine during servicing/maintenance. Such conventional handrails may be heavy and may increase human effort.

Further, some work machines include a foldable handrail. However, such foldable handrails may reduce structural continuity of the handrail. Moreover, such handrails may be complex in design, may include multiple parts, and may increase human effort.

U.S. Pat. No. 9,650,796 describes a telescopic and retractable bleacher system and handrail that stows with the bleacher system. The bleacher system is adapted to move between a first position in which seating is available for use and a closed position in which rows of seating surfaces are vertically stacked. The system includes handrails adapted to move between a use position when the system is in the first position and a stowed position when the system is in a closed position. A post of the handrail includes a cam and a cylinder surrounding the post includes a cam slot. A ramp on a surface of the aisle step engages the post and raises the post within the cylinder as the bleacher system is moved into the first position. As the post is raised in the cylinder, the corresponding cam and cam slot cause rotation of the post.

SUMMARY OF THE DISCLOSURE

In an aspect of the present disclosure, a guardrail assembly for an operator platform of a work machine is provided. The operator platform defines a major surface. The guardrail assembly includes a handrail removably coupled to the operator platform. The handrail includes a pair of first members spaced apart from each other and a second member coupled to and extending orthogonally between the pair of first members. The handrail defines a height orthogonal to the major surface. The handrail is movable between an extended position and a retracted position relative to the major surface of the operator platform. In the extended position, at least half of the height of the handrail is disposed above the major surface of the operator platform. In the retracted position, at least half of the height of the handrail is disposed below the major surface of the operator platform. The guardrail assembly also includes a pair of handrail locking mechanisms removably coupling the handrail to the operator platform. Each handrail locking mechanism is configured to engage with the handrail to dispose the handrail in the extended position. Each handrail locking mechanism is configured to disengage from the handrail to dispose the handrail in the retracted position. The guardrail assembly further includes a midrail removably coupled to each first member at corresponding opposing ends of the midrail. The midrail is substantially parallel to the second member of the handrail. The guardrail assembly includes a pair of midrail locking mechanisms removably coupling the midrail to each first member at corresponding opposing ends of the midrail. When the handrail is in the extended position, the pair of midrail locking mechanisms engage the midrail with corresponding first members of the handrail to dispose the midrail at a desired height along the pair of first members of the handrail. The pair of midrail locking mechanisms disengage the midrail from corresponding first members of the handrail to dispose the handrail in the retracted position.

In another aspect of the present disclosure, a work machine is provided. The work machine includes a frame. The work machine also includes an operator platform coupled to the frame. The operator platform defines a major surface. The work machine further includes a guardrail assembly for the operator platform. The guardrail assembly includes a handrail removably coupled to the operator platform. The handrail includes a pair of first members spaced apart from each other and a second member coupled to and extending orthogonally between the pair of first members. The handrail defines a height orthogonal to the major surface. The handrail is movable between an extended position and a retracted position relative to the major surface of the operator platform. In the extended position, at least half of the height of the handrail is disposed above the major surface of the operator platform. In the retracted position, at least half of the height of the handrail is disposed below the major surface of the operator platform. The guardrail assembly also includes a pair of handrail locking mechanisms removably coupling the handrail to the operator platform. Each handrail locking mechanism is configured to engage with the handrail to dispose the handrail in the extended position. Each handrail locking mechanism is configured to disengage from the handrail to dispose the handrail in the retracted position. The guardrail assembly further includes a midrail removably coupled to each first member at corresponding opposing ends of the midrail. The midrail is substantially parallel to the second member of the handrail. The guardrail assembly includes a pair of midrail locking mechanisms removably coupling the midrail to each first member at corresponding opposing ends of the midrail. When the handrail is in the extended position, the pair of midrail locking mechanisms engage the midrail with corresponding first members of the handrail to dispose the midrail at a desired height along the pair of first members of the handrail. The pair of midrail locking mechanisms disengage the midrail from corresponding first members of the handrail to dispose the handrail in the retracted position.

Other features and aspects of this disclosure will be apparent from the following description and the accompanying drawings.

BRIEF DESCRIPTION OF THE DRAWINGS

FIGS. 9A to 9F are schematic perspective views illustrating different designs of midrail locking mechanisms that may be associated with the guardrail assembly of FIG. 3A, according to various embodiments of the present disclosure.

DETAILED DESCRIPTION

Wherever possible, the same reference numbers will be used throughout the drawings to refer to the same or like parts.

Figure 1:
FIG. 1 is a schematic side view of a work machine, according to an embodiment of the present disclosure.
Figure 1:
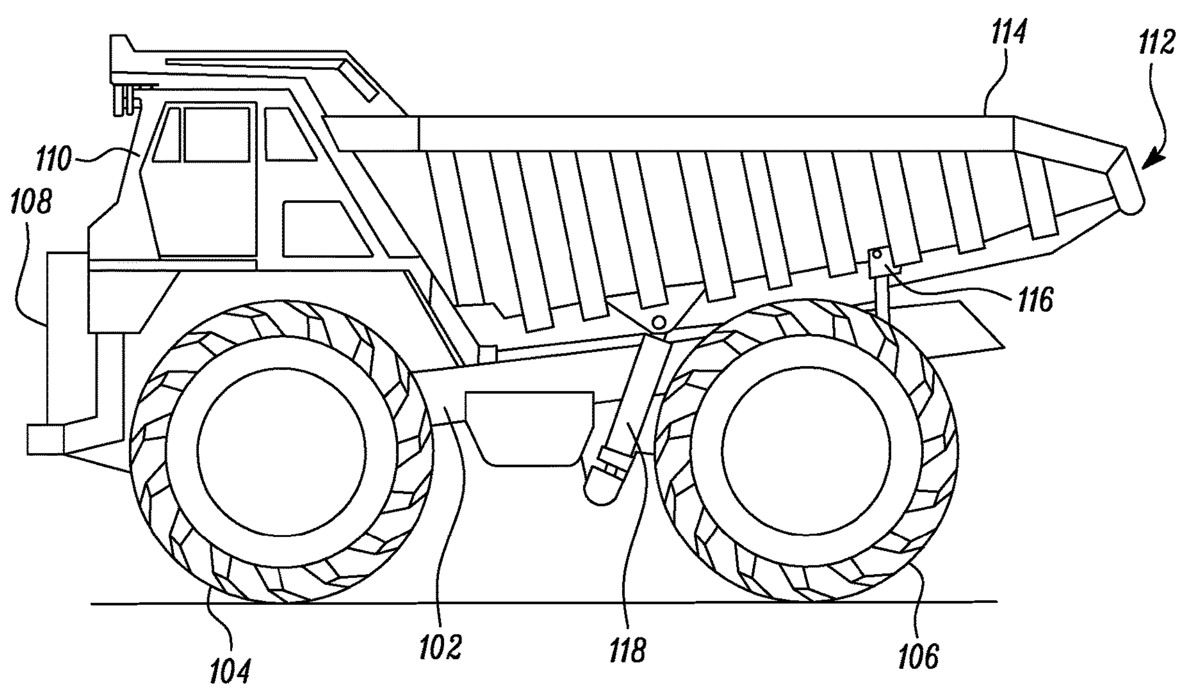

Referring to FIG. 1, a schematic side view of a work machine 100 is illustrated. The work machine 100 is embodied as a mining truck that may be used to move a payload, such as, asphalt, debris, dirt, snow, feed, gravel, logs, raw minerals, recycled material, rock, sand, woodchips, etc. from one location to another location. Alternatively, the work machine 100 may be a hydraulic excavator, a dozer, a wheel loader, a track-type tractor, a motor grader, etc. that may be used for various purposes, such as, digging, construction, landscaping, and the like in various industries. The work machine 100 may include any machine that includes one or more components, such as, a dump body, a work implement, and the like that may move relative to a fixed component, such as, a frame of the machine.

The work machine 100 includes a frame 102. The frame 102 supports a pair of front wheels 104 and a pair of rear wheels 106 of the work machine 100. The work machine 100 also includes an enclosure 108 and an operator cabin 110 mounted to the frame 102. The enclosure 108 may house a power source, such as, an engine (for e.g., an internal combustion engine), batteries, motors, and the like to provide power to various components of the work machine 100 for operational and mobility requirements. The operator cabin 110 may include one or more controls (not shown) that may enable an operator to control the work machine 100.

The work machine 100 further includes a dump body 112. The dump body 112 includes a box portion 114. The box portion 114 of the dump body 112 may hold the payload. The dump body 112 is pivotally attached to the frame 102 by a pair of supports 116. The work machine 100 also includes a pair of hydraulic cylinders 118. The hydraulic cylinders 118 are moveable between a first position C1 (shown in FIG. 2A) and a second position C2 (shown in FIG. 2B).

Figure 2A:
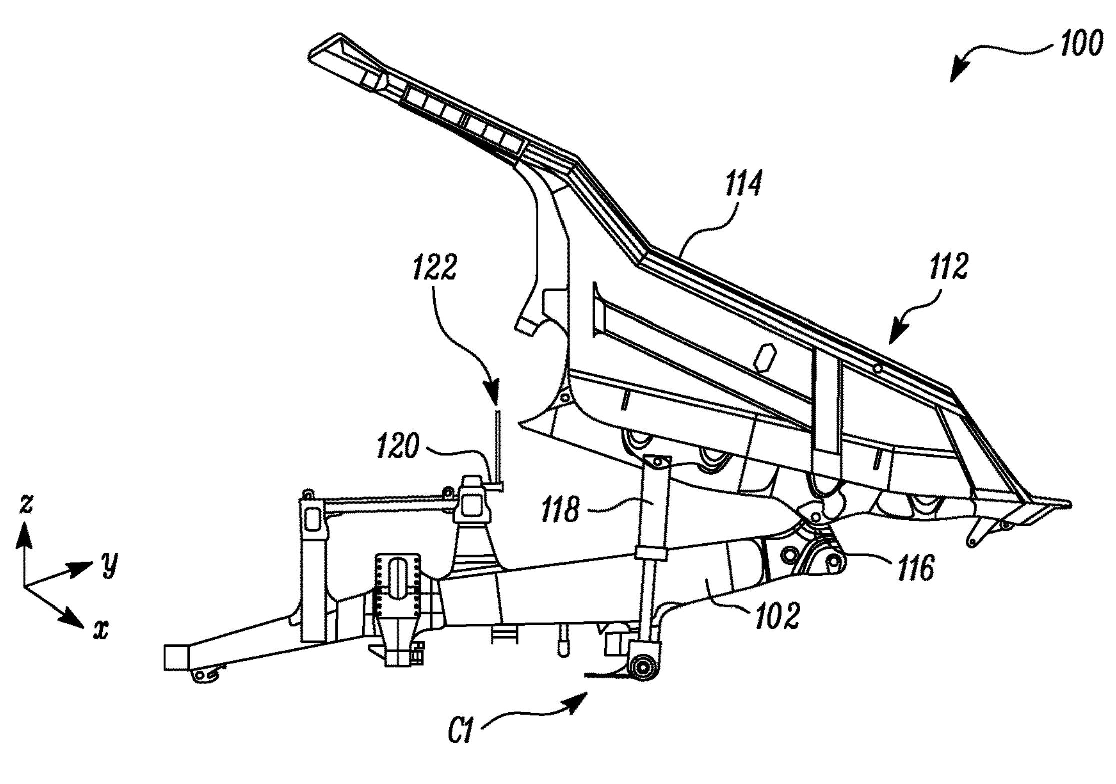
FIG. 2A is a schematic side view of a dump body associated with the work machine of FIG. 1 in a raised position.

FIG. 2A illustrates a schematic side view of the dump body 112 associated with the work machine 100 of FIG. 1, wherein the hydraulic cylinders 118 are in the first position C1. In the first position C1 of the hydraulic cylinders 118, each of the hydraulic cylinders 118 is in an extended configuration that in turn raises the box portion 114 of the dump body 112 and allows ejection of the payload from the box portion 114.

Figure 2B:
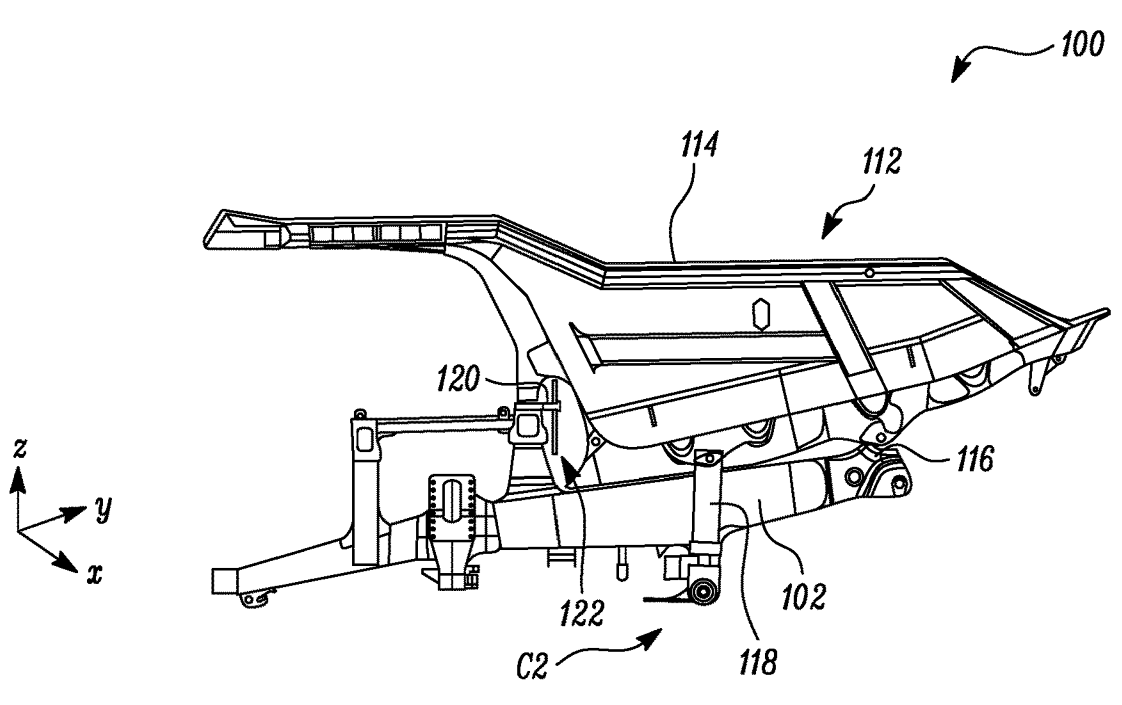
FIG. 2B is a schematic side view of the dump body of FIG. 1 in a lowered position.

FIG. 2B illustrates a schematic side view of the dump body 112, wherein the hydraulic cylinders 118 are in the second position C2. In the second position C2 of the hydraulic cylinders 118, each of the hydraulic cylinders 118 is in a retracted configuration and the box portion 114 of the dump body 112 is in a lowered position for receiving the payload.

With reference to FIGS. 2A and 2B, the work machine 100 includes an operator platform 120 coupled to the frame 102. The operator platform 120 defines a major surface A1 (shown in FIGS. 3A and 3B). The x and y-axes are disposed along the major surface A1 of the operator platform 120, while the z-axis is perpendicular to the major surface A1 of the operator platform 120. The work machine 100 also includes a guardrail assembly 122 for the operator platform 120.

Figure 3A:
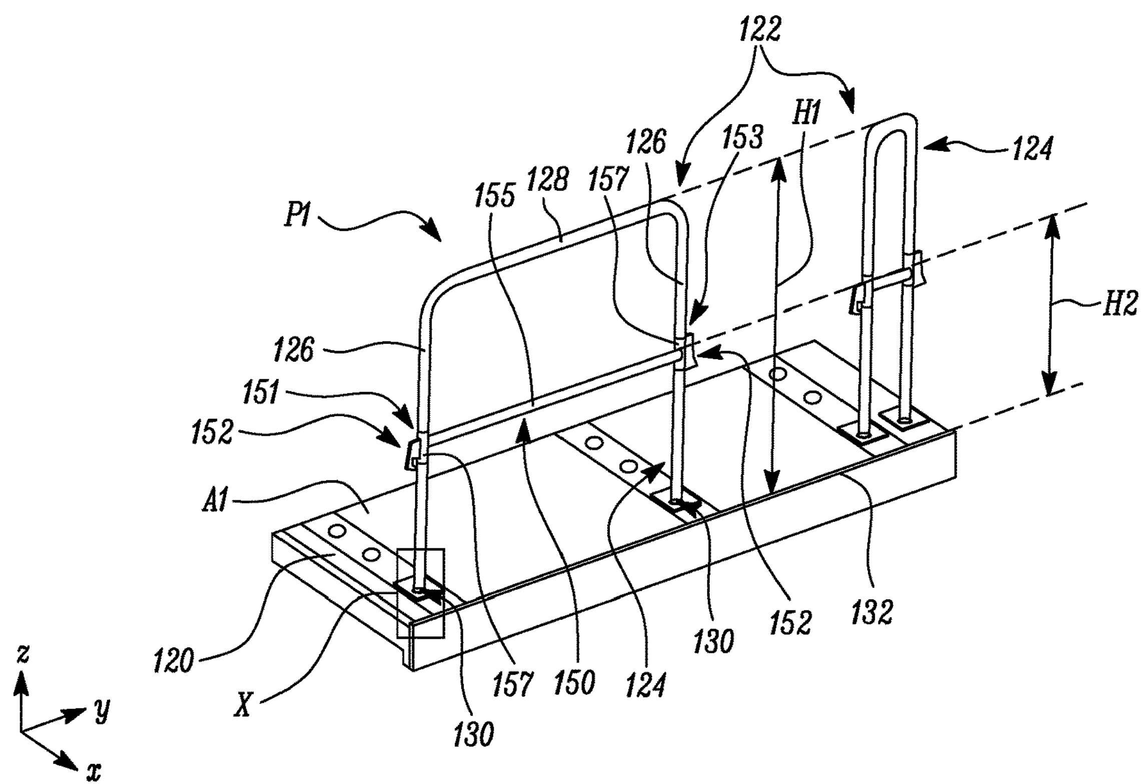
FIG. 3A is a schematic perspective view of a guardrail assembly for an operator platform of the work machine shown in FIG. 1, according to an embodiment of the present disclosure.

FIG. 3A illustrates a schematic perspective view of the guardrail assembly 122 for the operator platform 120 of the work machine 100 shown in FIG. 1, according to an embodiment of the present disclosure. In the illustrated embodiment of FIG. 3A, the work machine 100 includes two guardrail assemblies 122. In some other embodiments, the work machine 100 may include any number of guardrail assemblies 122 based on factors, such as, dimensions of the operator platform 120. Each guardrail assembly 122 includes same shape and design. However, the guardrail assembly 122 may have different dimensions as per dimensions of the operator platform 120. For explanatory purposes, only one of the guardrail assembly 122 will now be explained in detail.

The operator platform 120 defines a pair of first through-holes 130 extending orthogonally relative to the major surface A1 of the operator platform 120. In other words, the pair of first through-holes 130 extend along the z-axis. In the illustrated embodiment of FIG. 3A, the pair of first through-holes 130 are disposed proximal to an edge 132 of the operator platform 120.

The guardrail assembly 122 includes a handrail 124 removably coupled to the operator platform 120. The handrail 124 includes a pair of first members 126 spaced apart from each other and a second member 128 coupled to and extending orthogonally between the pair of first members 126. Specifically, the pair of first members 126 and the second member 128 together form an inverted U-shape. The first members 126 and the second member 128 have a circular cross-section herein. Alternatively, the first members 126 and the second member 128 may have a rectangular cross-section, a square cross-section, and the like. The handrail 124 defines a height H1 orthogonal to the major surface A1. In other words, the height H1 of the handrail 124 is disposed along the z-axis of the major surface A1. In some examples, the handrail 124 may be made of a metallic material, a polymeric material, or combinations thereof.

Further, the handrail 124 is movable between an extended position P1 and a retracted position P2 (shown in FIG. 3B) relative to the major surface A1 of the operator platform 120. Particularly, each first member 126 is configured to pass through a corresponding first through-hole 130 in the operator platform 120 to move the handrail 124 between the extended position P1 and the retracted position P2. Specifically, in FIG. 3A, the handrail 124 is illustrated in the extended position P1 relative to the operator platform 120. In the extended position P1, at least half of the height H1 of the handrail 124 is disposed above the major surface A1 of the operator platform 120. In the illustrated embodiment of FIG. 3A, more than 75% of the handrail 124 is disposed above the major surface A1. In other embodiments, more than 80%, 85%, or 90% of the handrail 124 may be disposed above the major surface A1.

Figure 3B:
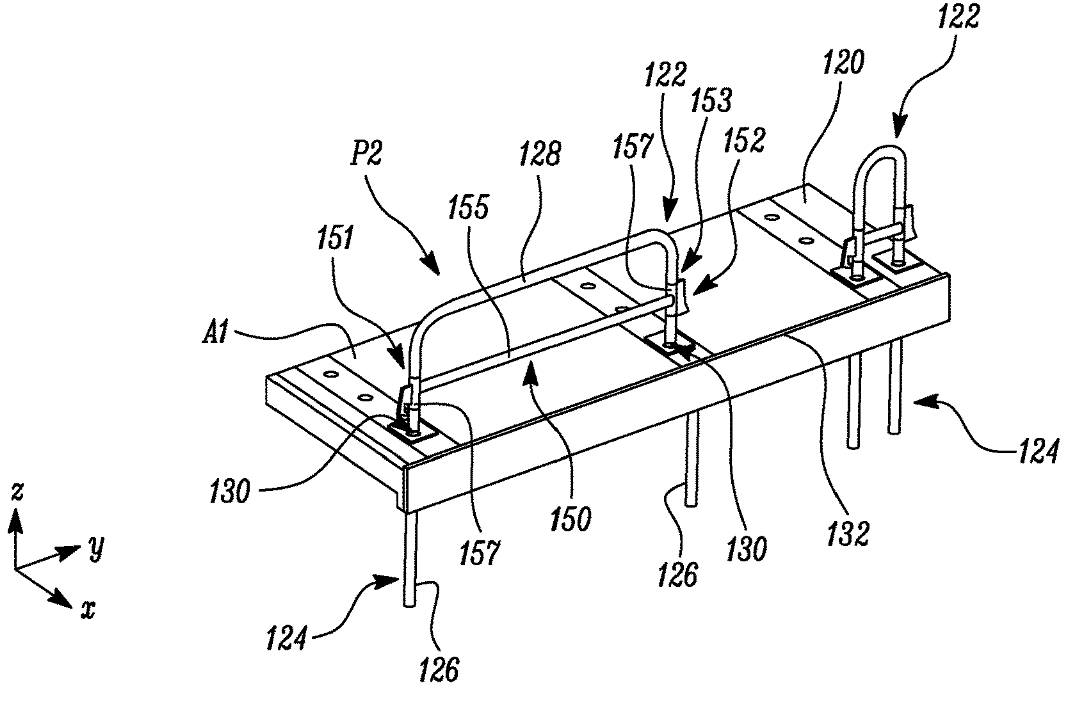
FIG. 3B is a schematic perspective view of the guardrail assembly of FIG. 3A wherein a handrail of the guardrail assembly is in a retracted position.

FIG. 3B illustrates a schematic perspective view of the guardrail assembly 122 when the handrail 124 is in the retracted position P2, according to an embodiment of the present disclosure. In the retracted position P2, at least half of the height H1 (see FIG. 3A) of the handrail 124 is disposed below the major surface A1 of the operator platform 120. In the illustrated embodiment of FIG. 3B, more than 75% of the handrail 124 is disposed below the major surface A1. In other embodiments, more than 80%, 85%, or 90% of the handrail 124 may be disposed below the major surface A1.

Figure 4A:
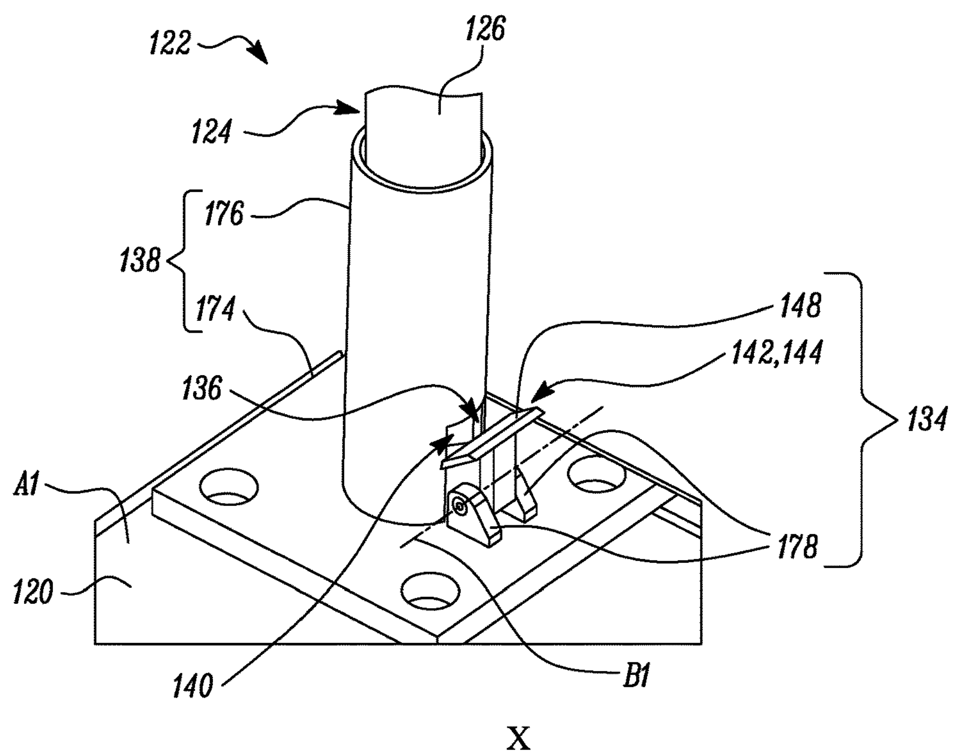
FIG. 4A is a schematic perspective view of a portion of the guardrail assembly of FIG. 3A wherein the handrail is in an extended position.
Figure 4B:
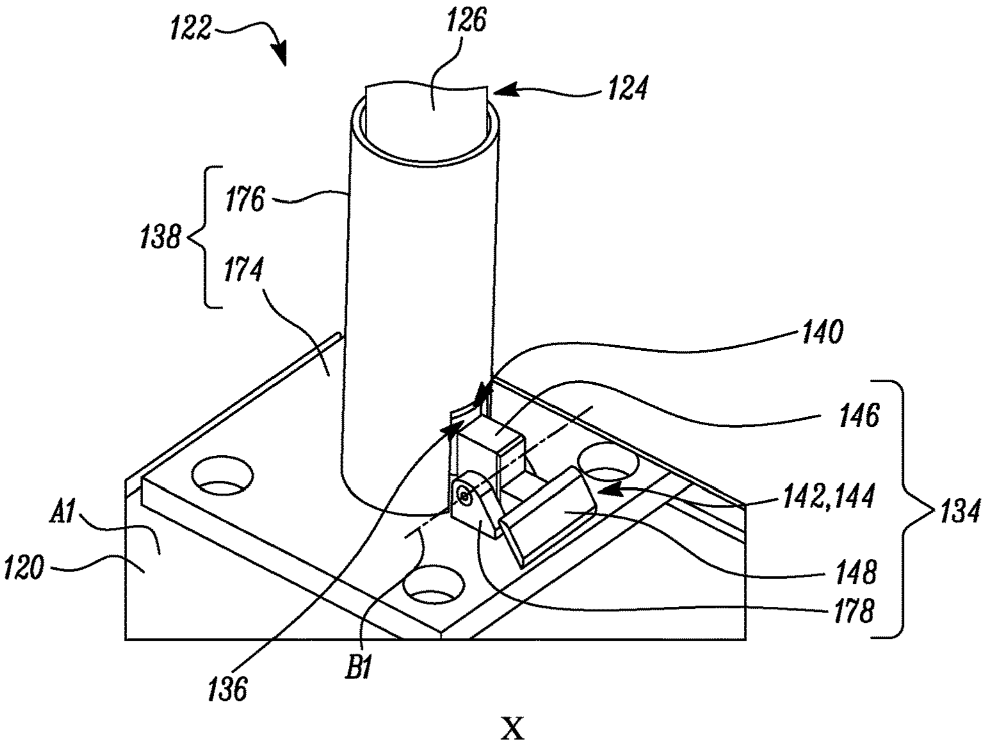
FIG. 4B is a schematic perspective view of the portion of the guardrail assembly of FIG. 4A wherein the handrail is in the retracted position.

FIG. 4A is an enlarged schematic perspective view of a portion X of the guardrail assembly 122 of FIG. 3A when the handrail 124 is in the extended position P1. FIG. 4B is an enlarged schematic perspective view of the portion X of the guardrail assembly 122 of FIG. 3A when the handrail 124 is in the retracted position P2.

With reference to FIGS. 4A and 4B, the operator platform 120 includes a pair of handrail coupling portions 138 (only one of which is shown in FIGS. 4A and 4B). Specifically, each first member 126 includes a corresponding handrail coupling portion 138. Each handrail coupling portion 138 may include a plate 174 coupled to the operator platform 120. In an example, the plate 174 may be coupled to the operator platform 120 via welding, or via a fastening means (not shown), such as, a bolt, a screw, and the like. Each pair of handrail coupling portion 138 may also include a coupling body 176 coupled to the plate 174 and extending orthogonal to the operator platform 120. The coupling body 176 includes a circular cross-section corresponding to a shape of the first members 126. In some other examples, the coupling body 176 may have a square cross-section, a rectangular cross-section, and the like based on the cross-section of the first member 126. Further, each first member 126 of the handrail 124 includes a first pocket 136. The first pocket 136 is rectangular herein.

The guardrail assembly 122 further includes a pair of handrail locking mechanisms 134 removably coupling the handrail 124 to the operator platform 120. Each handrail locking mechanism 134 engages with the handrail 124 to dispose the handrail 124 in the extended position P1 (as shown in FIG. 3A). Further, each handrail locking mechanism 134 disengages from the handrail 124 to dispose the handrail 124 in the retracted position P2 (as shown in FIG. 3B). Specifically, each handrail locking mechanism 134 includes a coupling member 142. In the illustrated embodiments of FIGS. 4A and 4B, the coupling member 142 includes a pivoting member 144 that pivots about a pivot axis B1.

The coupling member 142 further includes a pair of brackets 178 defining the pivot axis B1 about which the pivoting member 144 rotates. The pivoting member 144 also includes a retaining block 146 (shown in FIG. 4B) and a gripping means 148 that allows the retaining block 146 to pivot about the pivot axis B1. The retaining block 146 engages with the first member 126 to retain the handrail 124 in the extended position P1. Further, the retaining block 146 disengages from the first member 126 to dispose the handrail 124 in the retracted position P2. It should be noted that a design of the handrail locking mechanism 134 as described herein is exemplary in nature, and the handrail locking mechanism 134 may include any other design and/or combination of components.

Further, the pair of handrail coupling portions 138 define a second pocket 140 that is in alignment with corresponding first pockets 136 of the first member 126 to at least partially receive the handrail locking mechanism 134 to dispose the handrail 124 in the extended position P1. Specifically, the coupling body 176 of each handrail coupling portion 138 defines the second pocket 140. The second pocket 140 is rectangular herein.

Referring to FIG. 4A, when the second pocket 140 is in alignment with corresponding first pockets 136 of the first member 126, the pivoting member 144 may be rotated (for example, in an anticlockwise direction) about the pivot axis B1 by means of the gripping means 148 to at least partially receive the retaining block 146 in the second pocket 140 and the first pocket 136 to dispose the handrail 124 in the extended position P1.

Referring to FIG. 4B, in order to dispose the handrail 124 in the retracted position P2, the pivoting member 144 is rotated (for example, in a clockwise direction) about the pivot axis B1 by means of the gripping means 148 such that the retaining block 146 is disengaged from the second pocket 140 and the first pocket 136. The disengagement of the retaining block 146 may cause the first members 126 to slide through the corresponding first through-holes 130 (see FIG. 3A) in order to dispose the handrail 124 in the retracted position P2.

Referring to FIGS. 3A, and 3B the guardrail assembly 122 further includes a midrail 150 removably coupled to each first member 126 at corresponding opposing ends 151, 153 of the midrail 150. The midrail 150 includes a first portion 155 and a pair of second portions 157 orthogonal to the first portion 155. The second portions 157 are received within and movable along the corresponding first members 126. The midrail 150 is substantially parallel to the second member 128 of the handrail 124. Specifically, the first portion 155 of the midrail 150 is substantially parallel to the second member 128 of the handrail 124. The first portion 155 is substantially orthogonal to each first member 126. The midrail 150 includes a circular cross-section herein. Alternatively, the midrail 150 may include any other cross-section, as per requirements. The midrail 150 is removably coupled to the first members 126 at corresponding opposing ends 151, 153 of the midrail 150.

Figure 5A:
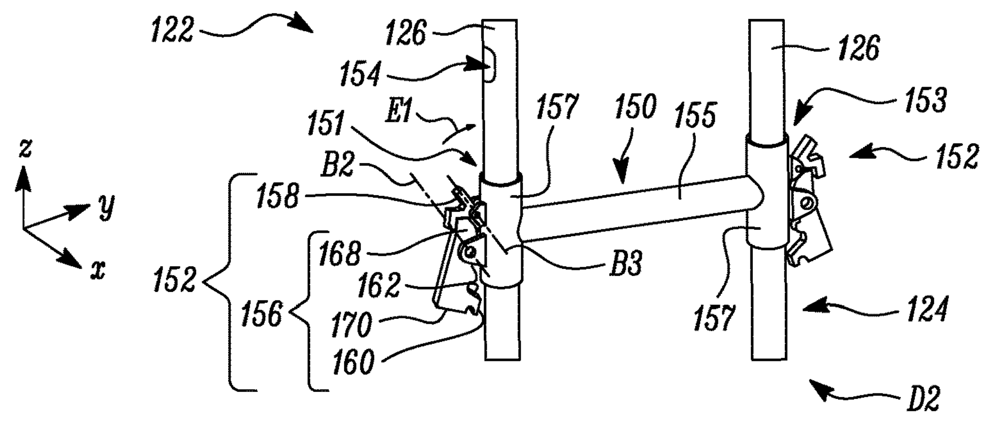
FIGS. 5A to 5C are schematic perspective views of a portion of the guardrail assembly of FIG. 3A illustrating an engagement process of a midrail locking mechanism with the handrail.
Figure 5B:
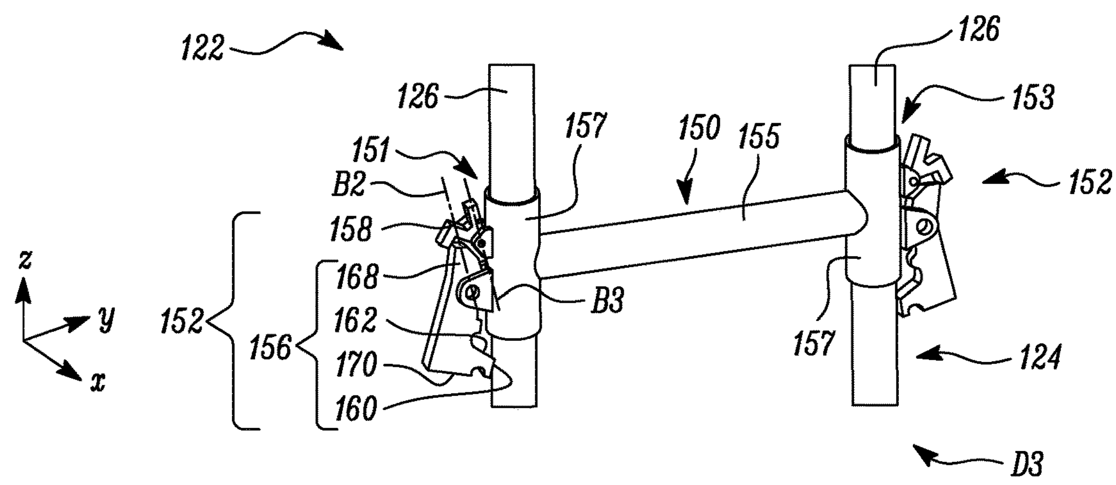
Figure 5C:
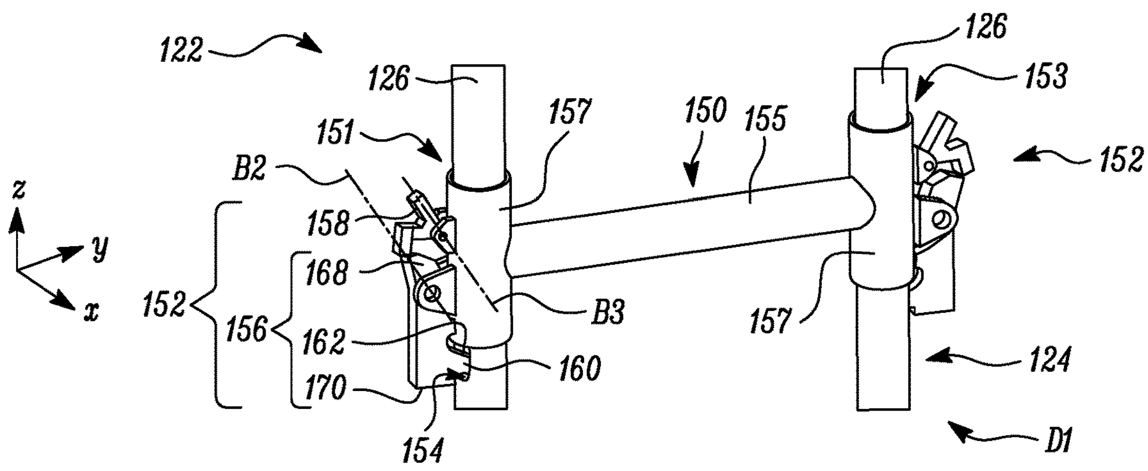

FIGS. 5A to 5C illustrate schematic perspective views of a portion of the guardrail assembly 122 of FIG. 3A. As shown in FIGS. 5A and 5C, each first member 126 of the handrail 124 includes a first slot 154 (visible in FIGS. 5A and 5C). Specifically, each first member 126 includes one first slot 154. Alternatively, each first member 126 may include multiple first slots disposed along the z-axis.

The guardrail assembly 122 also includes a pair of midrail locking mechanisms 152 removably coupling the midrail 150 to each first member 126 at corresponding opposing ends 151, 153 of the midrail 150. When the handrail 124 is in the extended position P1 (see FIG. 3A), the pair of midrail locking mechanisms 152 engage the midrail 150 with corresponding first members 126 of the handrail 124 to dispose the midrail 150 at a desired height H2 (see FIG. 3A) along the pair of first members 126 of the handrail 124. In some embodiments, the midrail 150 is disposable at a fixed desired height H2 relative to the major surface A1. Alternatively, the midrail 150 may be disposable at different desired heights relative to the major surface A1, for example, when the first member 126 may include multiple first slots (similar to the first slot 154 shown in FIG. 5C).

In some embodiments, the midrail locking mechanism 152 includes a first rocker arm 156 movable between an engaged position D1 (see FIG. 5C) and a disengaged position D2 (see FIG. 5A). Specifically, FIGS. 5A to 5C illustrates different views of the midrail locking mechanism 152 moving from the disengaged position D2 to the engaged position D1. Particularly, FIG. 5A illustrates the midrail locking mechanism 152 in the disengaged position D2. FIG. 5B illustrates the midrail locking mechanism 152 in an intermediate position D3. FIG. 5C illustrates the midrail locking mechanism 152 in the engaged position D1. The first rocker arm 156 includes a first engaging end 168 and a second engaging end 170. The first rocker arm 156 also includes a projection 160 having a taper surface 162 at the second engaging end 170. The first rocker arm 156 is configured to pivot about a pivot axis B2.

Further, in the engaged position D1, the first rocker arm 156 is received within and engages with the first slot 154 (see FIG. 5A) of the first member 126. Particularly, the projection 160 of the first rocker arm 156 is received within and engages with the first slot 154 of the first member 126 to dispose the first rocker arm 156 in the engaged position D1. Further, the midrail locking mechanism 152 includes a second rocker arm 158 to retain the first rocker arm 156 in the disengaged position D2. The second rocker arm 158 may be configured to pivot about a pivot axis B3.

As shown in FIG. 5A, the second rocker arm 158 locks with the first rocker arm 156. In an example, in order to dispose the first rocker arm 156 in the engaged position D1, a user may rotate the second rocker arm 158 about the pivot axis B3, for example, in a direction E1 which may cause the second rocker arm 158 to disengage from the first rocker arm 156. Further, as shown in FIG. 5B, the user may lift the midrail 150 with respect to each first member 126 by a small extent. Specifically, the midrail 150 is moved in an upward direction along the z-axis.

Moreover, as shown in FIG. 5C, the rotation of the second rocker arm 158 and the lifting of the midrail 150 may cause the first rocker arm 156 to rotate about the pivot axis B2 and allows the projection 160 of the first rocker arm 156 to be received within and engage with the first slot 154 of the first member 126, thereby locking the midrail 150 with the first member 126. Moreover, in the engaged position D1, the second rocker arm 158 is disengaged from the first rocker arm 156.

Figure 6A:
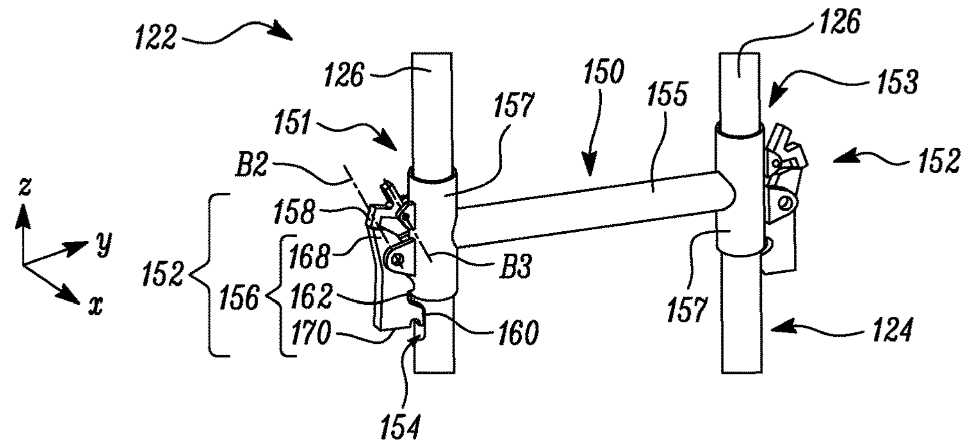
FIGS. 6A to 6C are schematic perspective views of the portion of the guardrail assembly of FIG. 5A to 5C illustrating a disengagement process of the midrail locking mechanism from the handrail.
Figure 6B:
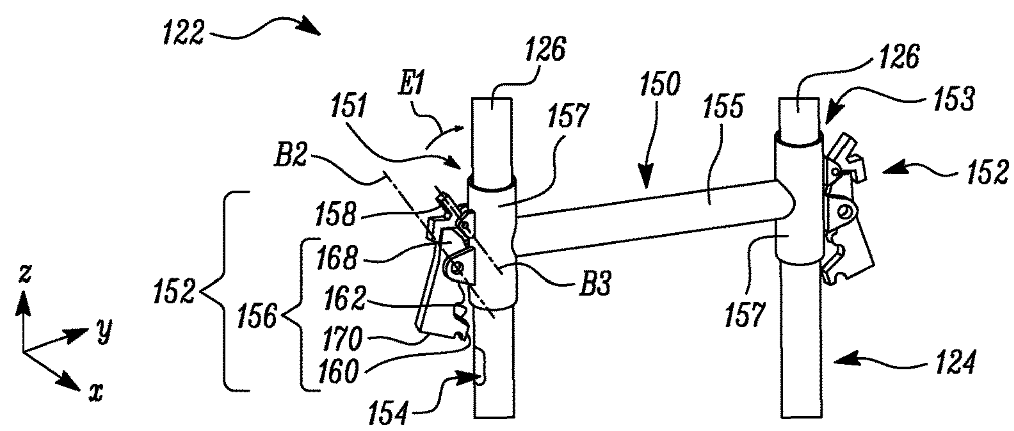
Figure 6C:
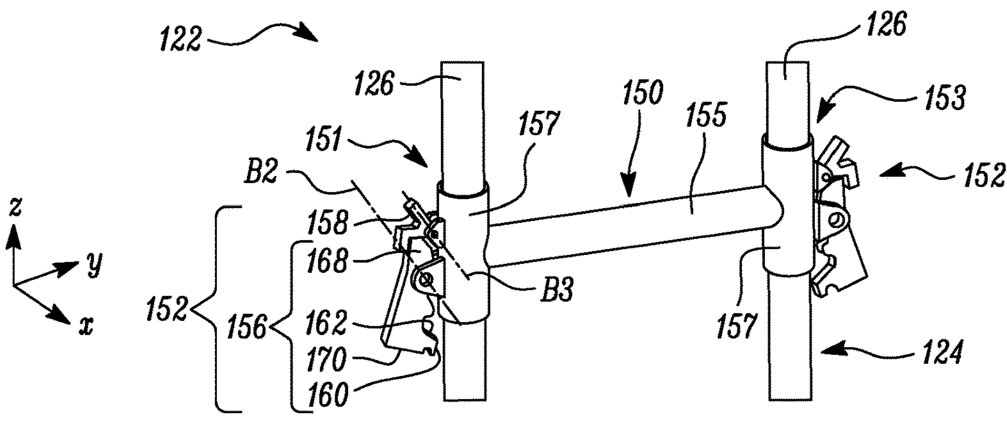

FIGS. 6A to 6C are schematic perspective views of a portion of the guardrail assembly 122 of FIG. 3A illustrating a disengagement of the midrail locking mechanisms 152 from the handrail 124.

The pair of midrail locking mechanisms 152 disengage the midrail 150 from corresponding first members 126 of the handrail 124 to dispose the handrail 124 in the retracted position P2 (see FIG. 3B). Particularly, in the disengaged position D2, the first rocker arm 156 is disengaged from the first slot 154.

As shown in FIG. 6A, in an example, in order to dispose the first rocker arm 156 in the disengaged position D2, the user may lift the midrail 150 by a small extent along each first member 126 such that the taper surface 162 of the first rocker arm 156 comes in contact with the first slot 154. Specifically, the midrail 150 is moved in the upward direction along the z-axis.

As shown in FIG. 6B, the lifting of the midrail 150 causes the first rocker arm 156 to rotate, for example, in the direction E1 about the pivot axis B2. Moreover, as shown in FIG. 6C, the rotation of the first rocker arm 156 disengages the projection 160 of the first rocker arm 156 from the first slot 154. Specifically, the first rocker arm 156 tilts and locks with the second rocker arm 158. Further, the second rocker arm 158 locks with the first rocker arm 156 such that the second rocker arm 158 prevents the engagement of the first rocker arm 156 with the first member 126. It should be noted that a design of the midrail locking mechanism 152 as described herein is exemplary in nature, and the midrail locking mechanism 152 may include any other design and/or combination of components.

Figure 7:
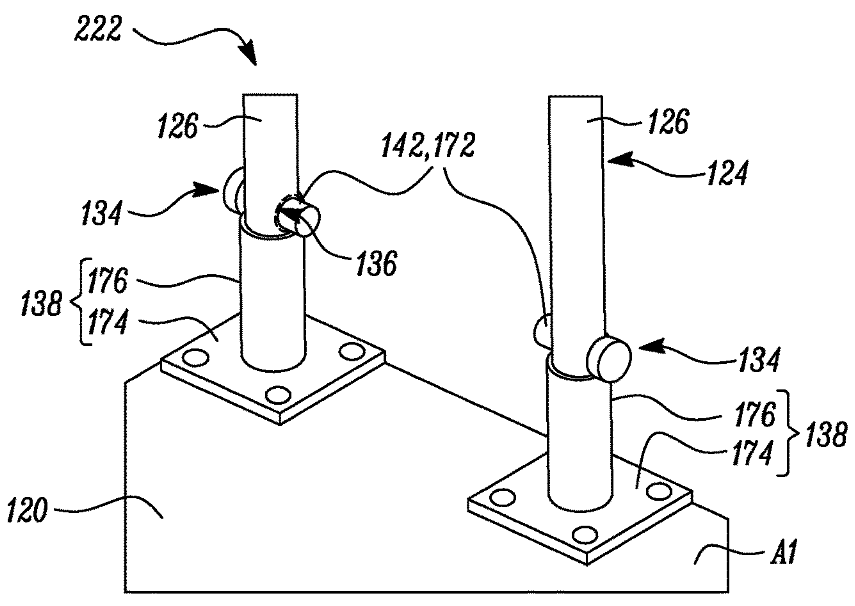
FIG. 7 is a schematic perspective view illustrating a handrail locking mechanism, according to another embodiment of the present disclosure.

FIG. 7 illustrates a schematic perspective view of a portion of the guardrail assembly 222 associated with the work machine 100 of FIG. 1, according to another embodiment of the present disclosure. The guardrail assembly 222 is functionally similar to the guardrail assembly 122 illustrated in FIG. 4A, with common components being referred to by the same reference numerals. However, the coupling member 142 of each handrail locking mechanism 134 of the guardrail assembly 222 includes a retaining pin 172 (instead of the pivoting member 144 shown in FIGS. 4A and 4B). The user may manually engage or disengage the retaining pin 172 from the first pocket 136 of the handrail 124 in order to dispose the handrail 124 in the extended position P1 (see FIG. 3A) and the retracted position P2 (see FIG. 3B). The first pocket 136 is circular herein. In some examples, each retaining pin 172 may have a length greater than a diameter of the coupling body 176 of the handrail coupling portion 138.

Figure 8:
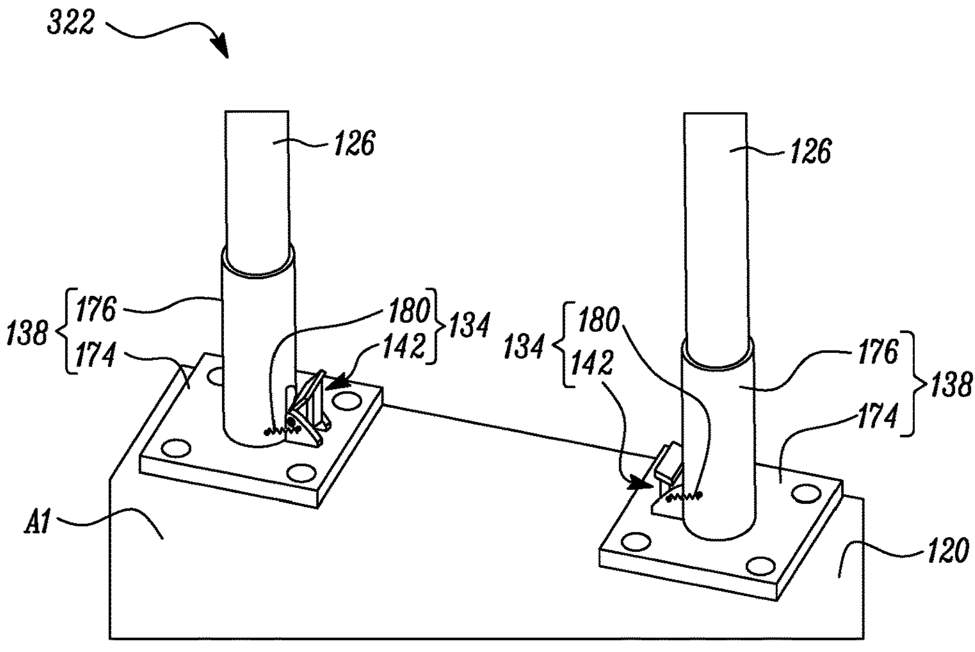
FIG. 8 is a schematic perspective view illustrating a handrail locking mechanism, according to yet another embodiment of the present disclosure.

FIG. 8 illustrates a schematic perspective view of a portion of the guardrail assembly 322 associated with the work machine 100 of FIG. 1, according to yet another embodiment of the present disclosure. The guardrail assembly 322 is functionally similar to the guardrail assembly 122 illustrated in FIG. 4A, with common components being referred to by the same reference numerals. However, each handrail locking mechanism 134 of the guardrail assembly 322 additionally includes a first biasing member 180 that biases the coupling member 142 towards the handrail 124 to engage the coupling member 142 with the handrail 124. Specifically, the first biasing member 180 and the retaining block 146 (see FIG. 4B) together retain the handrail locking mechanism 134 in engagement with the first member 126. In the illustrated embodiment of FIG. 8, each handrail locking mechanism 134 includes two first biasing members 180.

FIG. 9A illustrates a schematic perspective view of a portion of a guardrail assembly 422 associated with the work machine of FIG. 1, according to yet another embodiment of the present disclosure. The guardrail assembly 422 is functionally similar to the guardrail assembly 122 illustrated in FIG. 5A, with common components being referred to by the same reference numerals. However, the midrail locking mechanism 152 of the guardrail assembly 422 does not include the second rocker arm 158 as shown in FIGS. 5A to 6C. In order to dispose the first rocker arm 156 in the engaged position D1 (see FIG. 5C) or the disengaged position D2 (see FIG. 5A), the user may push the first engaging end 168 of the first rocker arm 156 for example in the direction E1 such that the first rocker arm 156 rotates about the pivot axis B2 to allow the movement of the first rocker arm 156 between the engaged position D1 and the disengaged position D2.

FIG. 9B illustrates a schematic perspective view of a portion of a guardrail assembly 522 associated with the work machine of FIG. 1, according to yet another embodiment of the present disclosure. The guardrail assembly 522 is functionally similar to the guardrail assembly 122 illustrated in FIG. 5A, with common components being referred to by the same reference numerals. However, the midrail locking mechanism 152 of the guardrail assembly 522 does not include the second rocker arm 158 as shown in FIGS. 5A to 6C. Further, the midrail locking mechanism 152 of the guardrail assembly 522 includes a second biasing member 182 (instead of the second rocker arm 158 shown in FIG. 4A) to retain the first rocker arm 156 in at least one of the engaged position D1 (see FIG. 5C) and the disengaged position D2 (see FIG. 5A). In the illustrated embodiment of FIG. 9B, the second biasing member 182 includes a compression spring. The second biasing member 182 is connected between the first engaging end 168 of the first rocker arm 156 and the first member 126. In order to dispose the first rocker arm 156 in the engaged position D1 or the disengaged position D2, the user may push the first engaging end 168 of the first rocker arm 156 for example in the direction E1 against a biasing force of the second biasing member 182. Further, the first rocker arm 156 rotates about the pivot axis B2 to allow the movement of the first rocker arm 156 between the engaged position D1 and the disengaged position D2. Furthermore, the second biasing member 182 biases the first rocker arm 156 towards the first member 126 in order to engage the first rocker arm 156 with the first member 126.

FIG. 9C illustrates a schematic perspective view of a portion of a guardrail assembly 622 associated with the work machine of FIG. 1, according to yet another embodiment of the present disclosure. The guardrail assembly 622 is functionally similar to the guardrail assembly 122 illustrated in FIG. 5A, with common components being referred to by the same reference numerals. However, the midrail locking mechanism 152 of the guardrail assembly 622 does not include the second rocker arm 158 as shown in FIGS. 5A to 6C. Further, the midrail locking mechanism 152 of the guardrail assembly 622 includes a second biasing member 682 (instead of the second rocker arm 158 shown in FIG. 4A) to retain the first rocker arm 156 in at least one of the engaged position D1 (see FIG. 5C) and the disengaged position D2 (see FIG. 5A). In the illustrated embodiment of FIG. 9B, the second biasing member 682 includes a tension spring. The second biasing member 682 is connected between the second engaging end 170 of the first rocker arm 156 and the first member 126. In order to dispose the first rocker arm 156 in the engaged position D1 or the disengaged position D2, the user may push the first engaging end 168 of the first rocker arm 156 for example in the direction E1 against a biasing force of the second biasing member 682. Further, the first rocker arm 156 rotates about the pivot axis B2 to allow the movement of the first rocker arm 156 between the engaged position D1 and the disengaged position D2. Furthermore, the second biasing member 682 biases the first rocker arm 156 towards the first member 126 in order to engage the first rocker arm 156 with the first member 126.

FIG. 9D illustrates a schematic perspective view of a portion of a guardrail assembly 722 associated with the work machine of FIG. 1, according to yet another embodiment of the present disclosure. The guardrail assembly 722 is functionally similar to the guardrail assembly 122 illustrated in FIG. 5A, with common components being referred to by the same reference numerals. However, the midrail 150 of the guardrail assembly 722 defines a pair of second slots 184 at the opposing ends 151, 153 of the midrail 150. Each midrail locking mechanism 152 includes a retaining pin 186. The first slot 154 (see FIG. 5A) of each first member 126 is in alignment with a corresponding second slot 184 from the pair of second slots 184 to receive the retaining pin 186 therethrough. In other words, the user may engage or disengage the retaining pin 186 when the first slot 154 and the corresponding second slot 184 are in alignment with each other to lock the midrail 150 with the handrail 124.

FIG. 9E illustrates a schematic perspective view of a component that may be used as a midrail locking mechanism 852 and/or a handrail locking mechanism 856 that may be associated with the guardrail assembly 122 shown in FIGS. 3A and 3B, according to yet another embodiment of the present disclosure. In the illustrated embodiment of FIG. 9E, the midrail locking mechanism 852 and/or the handrail locking mechanism 856 includes a knob 854.

Further, when the midrail locking mechanism 852 includes the knob 854, the knob 854 may pass through the second slot 184 (see FIG. 9D) in the midrail 150 and the first slot 154 in the first member 126 of the handrail 124 to engage the midrail 150 with the first member 126. Moreover, when the handrail locking mechanism 856 includes the knob 854, the knob 854 may pass through the first pocket 136 (see FIG. 7) of the handrail 124 in order to dispose the handrail 124 in the extended position P1 (see FIG. 3A) and the retracted position P2 (see FIG. 3B).

FIG. 9F illustrates a schematic perspective view of an exemplary component that may be used as midrail locking mechanism 952 and/or a handrail locking mechanism 956 that may be associated with the guardrail assembly 122 shown in FIGS. 3A and 3B, according to yet another embodiment of the present disclosure. In the illustrated embodiment of FIG. 9F, the midrail locking mechanism 952 and/or the handrail locking mechanism 956 includes a latching cam 954.

Further, when the midrail locking mechanism 952 includes the latching cam 954, the latching cam 954 may engage the midrail 150 with the first member 126. Moreover, when the handrail locking mechanism 956 includes the latching cam 954, the latching cam 954 may engage the handrail 124 with the handrail coupling portions 138 (see FIG. 7) to dispose the handrail 124 in the extended position P1 (see FIG. 3A) and the retracted position P2 (see FIG. 3B). The latching cam 954 includes an L-type latching cam herein. Alternatively, the latching cam 954 may include a T-type latching cam, a wing type latching cam, a swing type latching cam, a ring type latching cam, a paddle type latching cam, or a recessed type latching cam.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The guardrail assembly 122, 222, 322, 422, 522, 622, 722 in accordance with the present disclosure may be simple in design and easy to move between the extended position P1 and the retracted position P2. Further, the handrail 124 may be easily moved to the retracted position P2 below the operator platform 120, which may eliminate a requirement of removal and re-coupling of the guardrail assembly 122, 222, 322, 422, 522, 622, 722. Furthermore, the guardrail assembly 122, 222, 322, 422, 522, 622, 722 described herein may utilize the space below the operator platform 120 and/or the dump body 112 and may also eliminate a requirement of separate storage space for storing the guardrail assembly 122, 222, 322, 422, 522, 622, 722 on the work machine 100. Moreover, the guardrail assembly 122, 222, 322, 422, 522, 622, 722 described herein may reduce human effort as the guardrail assembly 122, 222, 322, 422, 522, 622, 722 may not have to be completely disassembled from the operator platform 120.

During service or maintenance procedure of the work machine 100 and when the dump body 112 is in the raised position, the user may dispose the handrail 124 in the extended position P1 by coupling the handrail 124 to the operator platform 120 via the pair of handrail locking mechanisms 134, 856, 956. Further, during normal work operations of the work machine 100, the user may disengage the pair of handrail locking mechanisms 134, 856, 956 to dispose the handrail 124 in the retracted position P2, therefore allowing the dump body 112 to be disposed in the lowered position. Furthermore, the guardrail assembly 122, 222, 322, 422, 522, 622, 722 does not interfere with the dump body 112 in the retracted position P2.

The first members 126 and the second member 128 of the handrail 124 may maintain structural continuity of the handrail 124. Furthermore, the handrail locking mechanism 134, 856, 956 and the midrail locking mechanism 152, 852, 952 may facilitate easy and quick switching of the handrail 124 in the extended position P1 or the retracted position P2. Further, the guardrail assembly 122, 222, 322, 422, 522, 622, 722 may include fewer part numbers when compared to conventional guardrail assemblies, may be cost-effective, and may be retrofitted on existing machines.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A guardrail assembly for an operator platform of a work machine, the operator platform defining a major surface, the guardrail assembly comprising:

a handrail removably coupled to the operator platform, the handrail including a pair of first members spaced apart from each other and a second member coupled to and extending orthogonally between the pair of first members, the handrail defining a height orthogonal to the major surface, wherein the handrail is movable between an extended position and a retracted position relative to the major surface of the operator platform, wherein, in the extended position, at least half of the height of the handrail is disposed above the major surface of the operator platform, and wherein in the retracted position, at least half of the height of the handrail is disposed below the major surface of the operator platform;

a pair of handrail locking mechanisms removably coupling the handrail to the operator platform, wherein each handrail locking mechanism is configured to engage with the handrail to dispose the handrail in the extended position, and wherein each handrail locking mechanism is configured to disengage from the handrail to dispose the handrail in the retracted position;

a midrail removably coupled to each first member at corresponding opposing ends of the midrail, wherein the midrail is substantially parallel to the second member of the handrail; and a pair of midrail locking mechanisms removably coupling the midrail to each first member at corresponding opposing ends of the midrail, wherein, when the handrail is in the extended position, the pair of midrail locking mechanisms engage the midrail with corresponding first members of the handrail to dispose the midrail at a desired height along the pair of first members of the handrail, and wherein the pair of midrail locking mechanisms disengage the midrail from corresponding first members of the handrail to dispose the handrail in the retracted position.

2. The guardrail assembly of claim 1, wherein the operator platform defines a pair of first through-holes extending orthogonally relative to the major surface of the operator platform, and wherein each first member is configured to pass through a corresponding first through-hole in the operator platform to move the handrail between the extended position and the retracted position.

3. The guardrail assembly of claim 1, wherein each first member of the handrail includes a first pocket, wherein the operator platform includes a pair of handrail coupling portions, and wherein the pair of handrail coupling portions define a second pocket that is in alignment with corresponding first pockets of the first member to at least partially receive the handrail locking mechanism to dispose the handrail in the extended position.

4. The guardrail assembly of claim 1, wherein each handrail locking mechanism includes a coupling member, and wherein the coupling member includes at least one of a retaining pin and a pivoting member configured to pivot about a pivot axis.

5. The guardrail assembly of claim 4, wherein each handrail locking mechanism further includes a first biasing member that biases the coupling member towards the handrail to engage the coupling member with the handrail.

6. The guardrail assembly of claim 1, wherein each first member of the handrail includes a first slot.

7. The guardrail assembly of claim 6, wherein the midrail defines a pair of second slots at the opposing ends of the midrail, wherein each midrail locking mechanism includes a retaining pin, and wherein the first slot of each first member is in alignment with a corresponding second slot from the pair of second slots to receive the retaining pin therethrough.

8. The guardrail assembly of claim 6, wherein each midrail locking mechanism includes a first rocker arm movable between an engaged position and a disengaged position, wherein, in the engaged position, the first rocker arm is received within and engages with the first slot of the first member, and wherein, in the disengaged position, the first rocker arm is disengaged from the first slot.

9. The guardrail assembly of claim 8, wherein each midrail locking mechanism further includes at least one of a second rocker arm and a second biasing member to retain the first rocker arm in at least one of the engaged position and the disengaged position.

10. The guardrail assembly of claim 1, wherein at least one of the midrail locking mechanism and the handrail locking mechanism includes at least one of a knob and a latching cam.

11. A work machine comprising:

a frame;

an operator platform coupled to the frame, the operator platform defining a major surface; and a guardrail assembly for the operator platform, the guardrail assembly including:

a handrail removably coupled to the operator platform, the handrail including a pair of first members spaced apart from each other and a second member coupled to and extending orthogonally between the pair of first members, the handrail defining a height orthogonal to the major surface, wherein the handrail is movable between an extended position and a retracted position relative to the major surface of the operator platform, wherein, in the extended position, at least half of the height of the handrail is disposed above the major surface of the operator platform, and wherein in the retracted position, at least half of the height of the handrail is disposed below the major surface of the operator platform;

a pair of handrail locking mechanisms removably coupling the handrail to the operator platform, wherein each handrail locking mechanism is configured to engage with the handrail to dispose the handrail in the extended position, and wherein each handrail locking mechanism is configured to disengage from the handrail to dispose the handrail in the retracted position;

a midrail removably coupled to each first member at corresponding opposing ends of the midrail, wherein the midrail is substantially parallel to the second member of the handrail; and a pair of midrail locking mechanisms removably coupling the midrail to each first member at corresponding opposing ends of the midrail, wherein, when the handrail is in the extended position, the pair of midrail locking mechanisms engage the midrail with corresponding first members of the handrail to dispose the midrail at a desired height along the pair of first members of the handrail, and wherein the pair of midrail locking mechanisms disengage the midrail from corresponding first members of the handrail to dispose the handrail in the retracted position.

12. The work machine of claim 11, wherein the operator platform defines a pair of first through-holes extending orthogonally relative to the major surface of the operator platform, and wherein each first member is configured to pass through a corresponding first through-hole in the operator platform to move the handrail between the extended position and the retracted position.

13. The work machine of claim 11, wherein each first member of the handrail includes a first pocket, wherein the operator platform includes a pair of handrail coupling portions, and wherein the pair of handrail coupling portions define a second pocket that is in alignment with corresponding first pockets of the first member to at least partially receive the handrail locking mechanism to dispose the handrail in the extended position.

14. The work machine of claim 11, wherein each handrail locking mechanism includes a coupling member, and wherein the coupling member includes at least one of a retaining pin and a pivoting member configured to pivot about a pivot axis.

15. The work machine of claim 14, wherein each handrail locking mechanism further includes a first biasing member that biases the coupling member towards the handrail to engage the coupling member with the handrail.

16. The work machine of claim 11, wherein each first member of the handrail includes a first slot.

17. The work machine of claim 16, wherein the midrail defines a pair of second slots at the opposing ends of the midrail, wherein each midrail locking mechanism includes a retaining pin, and wherein the first slot of each first member is in alignment with a corresponding second slot from the pair of second slots to receive the retaining pin therethrough.

18. The work machine of claim 16, wherein each midrail locking mechanism includes a first rocker arm movable between an engaged position and a disengaged position, wherein, in the engaged position, the first rocker arm is received within and engages with the first slot of the first member, and wherein, in the disengaged position, the first rocker arm is disengaged from the first slot.

19. The work machine of claim 18, wherein each midrail locking mechanism further includes at least one of a second rocker arm and a second biasing member to retain the first rocker arm in at least one of the engaged position and the disengaged position.

20. The work machine of claim 11, wherein at least one of the midrail locking mechanism and the handrail locking mechanism includes at least one of a knob and a latching cam.

* * * * *